United States Patent [19]

Bliek et al.

[11] Patent Number: 4,675,864
[45] Date of Patent: Jun. 23, 1987

[54] SERIAL BUS SYSTEM

[75] Inventors: Genevieve M. Bliek, Roseland; Kent W. Luehman, Rockaway, both of N.J.

[73] Assignee: Hewlett-Packard Company, Palo Alto, Calif.

[21] Appl. No.: 740,949

[22] Filed: Jun. 4, 1985

[51] Int. Cl.[4] .......................... H04J 3/02; H04J 3/16
[52] U.S. Cl. ........................................ 370/85; 370/90
[58] Field of Search ...................... 370/85, 90, 96, 92; 340/825.06, 825.07, 825.08, 825.52

[56] References Cited

U.S. PATENT DOCUMENTS 3,921,139 11/1975 Hardesty, Jr. et al. ......... 340/825.52
3,963,870 6/1976 Couder et al. ..................... 370/85
4,242,749 12/1980 Takezoe .............................. 370/85

Primary Examiner—Douglas W. Olms
Assistant Examiner—Wellington Chin
Attorney, Agent, or Firm—Donald N. Timbie

[57] ABSTRACT

A serial bus system in which frames are sent from a central station to a plurality of substations over a first conductor and information is sent from the substation to the central station over a second conductor. Each transmitted frame contains bits identifying whether it is for address, data or a command. An addressed substation sends a handshake back to the central station by changing the logic level of the second conductor. An address frame contains a bit indicating whether a message is to be written into a register of a substation or read from a register therein. Any substation can interrupt to request service from the central station by changing the logic level of the second conductor if the last command on the first conductor is an unaddress command indicating the end of a message.

5 Claims, 6 Drawing Figures

| STATUS | ERROR | TIME OUT | IRQ | BUSY | | | | |
|---|---|---|---|---|---|---|---|---|
| COMMAND | U/S | X/A2 | X/A1 | X/A0 | C3 | C2 | C1 | C0 |
| ADDRESS | R/W | A2 | A1 | A0 | R3 | R2 | R1 | R0 |
| WR DATA | D7 | D6 | D5 | D4 | D3 | D2 | D1 | D0 |
| RD DATA | D7 | D6 | D5 | D4 | D3 | D2 | D1 | D0 |

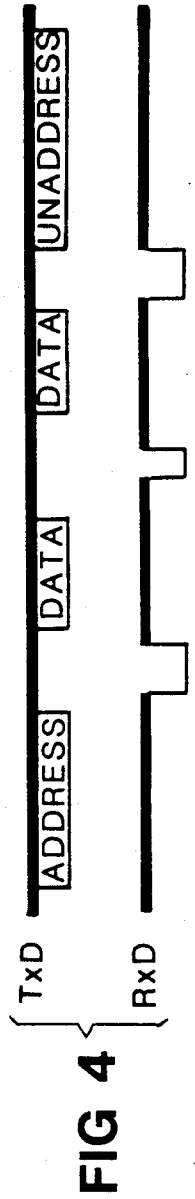
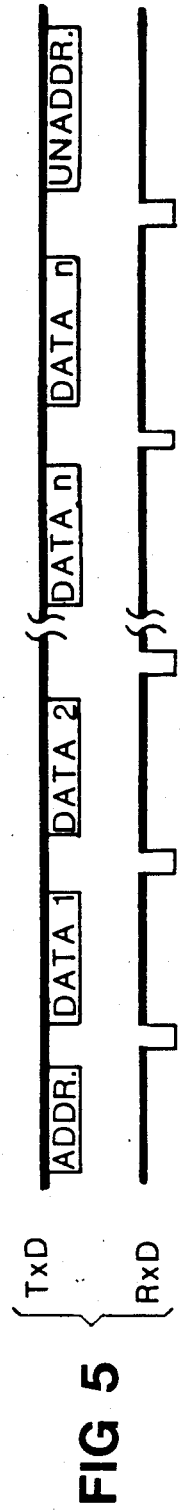

SERIAL BUS SYSTEM

BACKGROUND OF THE INVENTION

A number of situations exist where it is desired to provide communication between a computer controlled central station and a plurality of substations. If speed is required, the communication is usually provided by a parallel bus in which each bit of a frame in a message is conveyed from the central station to a substation by a separate conductor, but if there is sufficient time, the expense of isolation means can be avoided by using a serial bus in which the bits of each frame are conveyed in sequence via a single conductor.

A number of serial bus systems are known e.g., the RS232C industry standard and modifications thereof. They often require constant polling of the substations so that asynchronous operation in which any substation can request servicing by the central station is not available. Furthermore, in some systems the substations are not able to acknowledge the receipt of data or to give an indication to the central station of its accuracy.

BRIEF DESCRIPTION OF THE INVENTION

In accordance with this invention, a microprocessor is provided for the central station that communicates with the computer controlling the central station via a number of registers. The microprocessor in the central station also communicates with a microprocessor in each substation. The latter microprocessors control their respective substations. Information being sent from the central station to a substation is conveyed by one conductor hereinafter called Txd and information being sent from any substation to the central station is conveyed by a separate conductor hereinafter called Rxd. The registers include a STATUS register, which has bits indicating an in transmission error when a timely handshake has not been received, when an interrupt request has been received from by one of the substations and the fact that the microprocessor for the central station is busy; a COMMAND register having a bit indicating whether the command is for all stations or only one station, the address of the latter station and the command itself; an ADDRESS register that includes the address of the station, the register therein with which the communication is to occur and a R/W bit indicating whether data is to be written into that register or read from it; a WR DATA register containing data that is to be conveyed to the substation; and a RD DATA register into which data read from a substation is to be temporarily stored.

The protocol by which the system operates can be best explained with the aid of the following examples. If the computer desires to send data to one of the substations, it loads the ADDRESS register with the address of the station, an identification of the register therein that is to be written into and sets the R/W bit at the required logic level. In addition, it informs the microprocessor for the central station, hereinafter referred to as a uPC, that the ADDRESS register has just been loaded and sets the BSY flag in the STATUS register. The uPC forms an ADDRESS frame including the bits read from the ADDRESS register, two bits, hereinafter called a transaction code, that identifies the frame as being one containing an address, a parity bit, a most significant bit known as a START bit and a least significant bit known as a STOP bit. The bits of the frame, starting with the most significant are serially placed on the conductor Txd.

The inputs of the microprocessors for the substations, which microprocessors are hereinafter indicated by uPS and a suitable subscript, are always coupled to Txd. When the START bit appears on Txd, the logic state of Txd is changed, thereby indicating to all uPS microprocessors that a message is about to be placed on Txd by the uPC. The next two bits, the transaction code, inform the substations that the byte of data immediately following them represents an address. The next bit indicates the parity of the frame as a whole and the STOP bit restores Txd to its original logic level.

In addition to cooperation with the uPC in respect to the write and read communications it controls, each of the substation microprocessors uPS monitors its own substation to see if it desires service from the central station. When the START bit just referred to appears on Txd, all of the station microprocessors disable their interrupt procedures.

Each of the substation microprocessors reads the address on Txd, and if it is the address of its substation it checks the parity of the entire frame and sends a handshake frame back to the uPC of the central station by changing the logic level of Rxd. If the parity checks, the logic level is changed for a predetermined time, such as three bits. If, however, parity does not check, the logic level is changed for a different predetermined time e.g., two bits. If parity does not check, the uPC may retransmit the frame at least one time, but if parity still does not check, the uPC sets an error flag in the interface STATUS register so as to inform the computer of the fact.

If the logic level of the Rxd line is not changed within a predetermined time after the STOP bit has restored Txd to its original logic level, the uPC sets a time out flag in the STATUS register so as to inform the computer.

After the ADDRESS frame is sent, the computer loads WR DATA register and the uPC sends a frame on Txd including the data, the transaction code for data, the parity bit and the START, STOP bits. The microprocessor uPS for the addressed substation performs the handshake as just described. In the programs for this particular embodiment of the invention, only one byte of data is transmitted in any given message, but any number could be sent, in which event the handshake procedure would follow each. After the last DATA frame is transmitted on Txd, the uPC sends an UNADDRESS command on Txd to the substations. The uPC includes the bits for this command in a frame that also has the transaction code for a command, the PARITY bit, the START, STOP bits and a bit indicating whether the command is for all substations or for a designated station. In the latter circumstance the address of the station is also included. The UNADDRESS command is universal i.e., it is for all substations and informs them that the communication is over.

Should the computer desire to read data from a particular register in a given substation, it sets the R/W bit in the ADDRESS register at a different logic level. Seeing this, the uPS for the addressed substation reads the data from the designated register and places it on the Rxd line with PARITY, START and STOP bits. The data is stored in the RD DATA register which has been designated by signals from the computer to the uPC. The presence of the data on Rxd makes it unnecessary for the uPS to perform a handshake for the read address. If no data is received by the uPC in a predetermined time, the uPC sets the time out flag in the STATUS register. If there is a parity error, the uPC requests the uPS to retransmit the data. After a given number of erroneous transmissions, the uPC sets the error flag in the STATUS register. After all data bytes have been received, the uPC places an UNADDRESS command on Txd. This informs all substations that the communication is over.

As previously noted, the series bus system of this invention has the capability of permitting any substation to request service from the computer. When the uPS detects that its substation desires to interrupt the computer, it signifies the fact by changing the logic level of Rxd from its quiescent value, but it does this only when the last frame received was an UNADDRESS command. This is necessary as the change in logic level of Rxd for the purpose of interruption might be confused with the change in level for a handshake. When Rxd changes level, the uPC knows that some substation has requested an interrupt but does not know which one. To determine this it polls the uPS for each substation by reading the substation STATUS register for each uPS to see if its interrupt flag is set and the kind of interrupt requested.

BRIEF DESCRIPTION OF THE DRAWING

FIG. 2 illustrates a frame that is transmitted on the serila bus;

FIG. 3 illustrates the code used to identify a frame;

FIG. 4 illustrates the handshaking procedure in the particular embodiment of the invention described herein in which a message has only one data frame;

FIG. 5 illustrates the handshaking procedure that would occur in an embodiment of the invention where a message has more than one data frame.

DETAILED DESCRIPTION OF THE INVENTION

Figures 1, 1A:
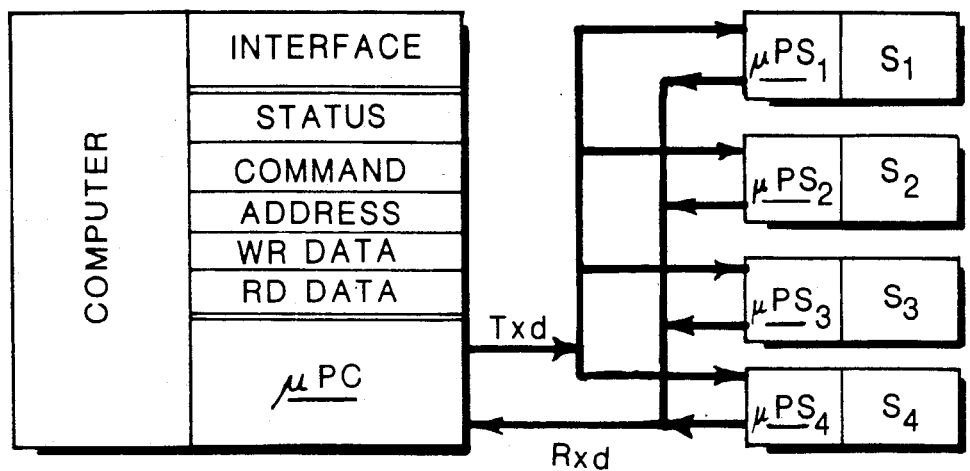
FIG. 1 is a block diagram of a system incorporating this invention.
FIG. 1A illustrates the registers of a microprocessor for the computer that are used in a serial bus system of this invention.

In the block diagram of FIG. 1 a computer C is interfaced with a microprocessor uPC via registers that are respectively for STATUS, COMMAND, ADDRESS, WR-DATA (data to be written), and RD DATA (data read). A conductor TXd carries frames of bits from the microprocessor uPC of a central station to each of the microprocessors $uPS_1$, $uPS_2$, $uPS_3$ and $uPS_4$ for the substations $S_1$, $S_2$, $S_3$ and $S_4$, and a conductor Rxd carries frames of bits to the microprocessor uPC from the microprocessors $uPS_1$, $uPS_2$, $uPS_3$ and $uPS_4$. The manner in which the microprocessor uPC transmits a message to one of the various substations is now explained by reference to a flow chart $F_T$ which is presented in written form rather than in block form. The uPC is type 8048 family, and the program for carrying out the steps is set forth in a program $P_T$ infra.

When the computer C has data to send to one of the substations $S_1$, $S_2$, $S_3$ or $S_4$, it sets the most significant bit of the ADDRESS register low so as to indicate that the data is to be transmitted, loads the next three bits, $A_2$, $A_1$ and $A_0$ with the address of the station to which the data is to go and loads the next four bits, $R_3$, $R_2$, $R_1$ and $R_0$ with an identification of the register of the substation into which the data is to be written.

As indicated at lines 20 and 21 of the flow chart $F_T$, the uPC determines that the ADDRESS register is the one to be read. The procedure then goes to line 33. The contents of the interface ADDRESS register are read into a register in the uPC, line 34, the parity error counter is initialized, line 35, and the transaction code 1,0 of FIG. 3 corresponding to an address frame is generated and added to the register in locations TR1 and TR0 of a frame shown in FIG. 2. The R/W bit in the interface ADDRESS register is checked, line 37. In this case, the R/W bit is low so as to indicate that data is to be transmitted. The frame parity bit is then calculated, line 40, and an address frame such as shown in FIG. 2 is sent over the conductor Txd. The frame includes a most significant START bit that is low and a least significant STOP bit that is high, the normal logic level of Txd being high.

At this point, line 42, the uPC waits for a handshake from the addressed station and performs the following functions, lines 42–47. As will be explained in connection with the operation of a substation microprocessor, that microprocessor will change the logic level of the conductor Rxd from high to low to acknowledge the receipt of a frame. If parity is proper, it holds Rxd low for the duration of two bits but if parity is not proper, Rxd is held low for one bit and the uPC retransmits the frame once more. If this transmission is not successful, the uPC sets the error flag in the STATUS register. Similarly, if the Rxd line does not go low within a given time after the STOP bit of the address frame, the time out flag TO is set in the status register. The sequences of events just described are illustrated in FIG. 4. After the address frame, Rxd is low for two bits indicating that the address has been properly received so that the data frame can be placed on the conductor Txd. But after the data frame has been placed on the conductor Txd by uPC, the conductor Rxd goes low for only one bit indicating that the parity of the data received by the substation is not the same as the parity of the data transmitted so that uPC retransmits the data. With the particular program $P_T$, only one data frame is permitted in a message so that the next frame is an UNADDRESS command. FIG. 5 illustrates the handshaking procedure in a system wherein a number of data frames may be transmitted in a message.

Assuming that the transmission of the address is followed by a handshake, indicating that the station has properly received the address, the computer C then loads data into the WR DATA interface register of FIG. 1A. As before, the uPC identifies that the WR DATA register has been loaded, lines 20 and 21, and proceeds to line 65. It places the data in a register, line 66, sets the TR1 and TR0 bits of FIGS. 2 to 1, 1 respectively so as to indicate that the frame contains data, line 67. The uPC then calculates the frame parity bit, line 68. At this point the data frame is sent on Txd and the uPC waits for the handshake from the station microprocessor as it did following the address frame. As presently implemented, the serial bus comprised of Txd and Rxd can only send one data frame at a time but there is no reason why it could not send more as illustrated in FIG. 5. When the last data frame is sent and properly received, or if retransmission has been unsuccessful, as indicated by setting the error flag in the STATUS register, the uPC sends an UNADDRESS command on Txd to all the substations.

In the event that the comuter C is to read from a register in a substation, it loads the ADDRESS register of the interface with the most significant bit R/W set high. After the microprocessor for the station having the data to be read sends this data on the Rxd line indicating that the address has been properly received, the uPC loads the data in the RD DATA interface register for the computer C to read, line 57.

The operation of the microprocessors uPS$_1$, uPS$_2$, uPS$_3$ and uPS$_4$ for the stations S$_1$, S$_2$, S$_3$ and S$_4$ respectively is now explained by reference to the flow chart F$_S$ which is in language rather than block form. The program for carrying out the various kinds of steps in F$_S$ with a microprocessor of the 8048 family is as set forth in the program listing P$_S$.

The initialization procedure for the uPS is set forth in lines 38–52. are In line 57 the substation microprocessor uPS examines its station to see if it is requesting an interrupt. If it is, it initiates the part of the program PS that handles the interrupt service, lines 356–358. Line 357 checks that the substation is permitted to request an interrupt as previously described including checking for UNADDRESS.

All of the substation microprocessors monitor the Txd line. When a frame is placed thereon by the uPC, the transaction code bits are examined so as to determine the type of frame, lines 97–103, and the appropriate section of the program PS is started. If, as previously described, the microprocessor, uPC, for the computer has placed an address frame on Txd line, line 100 sets in motion the address routine, the functions of which are set forth starting at line 107. Because the line Txd is in use, as evidenced by a frame being on it, all station microprocessors disable their interrupt procedures, line 108. Then they read the address, line 109, that is on Txd. If the address is not that of a station it updates certain flags and returns to line 57 where it checks to see if its station needs servicing by the computer C.

If a station sees its own address on Txd, its microprocessor examines the R/W bit. If it is high so as to indicate that the microprocessor uPC for the computer wishes to read from it, it inputs what is in the register to be read, line 120, calculates the parity, line 121, and sends the data to the uPC via the Rxd line.

Should the R/W bit be low, indicating that data is to be written into a register identified in the frame, the number of the register is stored, line 126, the handshake procedure previously described is initiated, line 127, and the substation microprocessor returns to line 57.

When examination of the transaction code by a station microprocessor indicates that the frame is for a command, the procedure goes to line 132. The U/S bit is examined, line 133, and it it is high, the command is universal, i.e., it is for all stations, and the functions of lines 137–161 are carried out. One of the universal commands is the UNADDRESS command that follows the data sent by the uPC so as to indicate that the particular transmission is completed. In this case the procedure of lines 148–153 is followed in which the station microprocessor sets a flag indicating the end of the transmission. There is no handshake following a universal command.

When, however, the U/S bit is low, the command is for a specific substation and the procedure goes to line 162. The substation address is read, line 163, and examined lines 164, 165, to see if this substation is the one to which the command is sent. If it is not, the procedure returns to line 57. If it is, the steps of lines 167–193 are carried out.

If the transaction code indicates that the frame on Txd is for data, line 102, the procedure goes to line 200. In line 201 it outputs the data to the designated register and provides a handshake as previously described, line 202.

What is claimed is:

1. A serial bus system comprising
   a central station and a plurality of subsidiary stations, each of said stations having its own processor, each of said processors having an input and an output,
   a first conductor forming a single path between the output of the processor for said central station and the inputs of the processors for said subsidiary station,
   a second conductor forming a single path between the outputs of the processors for said substations and the input of the processor for said central station,
   the processor for said central station being programmed to place the bits of a frame onto said first conductor in series,
   each of said processors for said subsidiary stations being programmed to respond to a frame on said first conductor that represents its address by changing the state of said second conductor for a first interval after the receipt of each frame if the frame does not have proper form or the microprocessor for the addressed station cannot process the frame or by changing the state of said second conductor for a second interval that is longer than said first interval if the frame has the proper form and the microprocessor for the addressed station can process the frame.

2. A serial bus system as set forth in claim 1 wherein the processor for said central station inserts a parity bit into a frame and wherein
   the processors for the substations are programmed to check the parity of a frame on the first conductor if that station is addressed and to change the state of said second conductor for said first interval if the parity of a frame does not agree with the parity bit inserted by the central station or to change the state of said second conductor for said second interval if the parity of the frame agrees with the parity bit.

3. A serial bus system as set forth in claim 2 wherein the processor for the central station is programmed to retransmit a frame on said first conductor if the state of said second conductor is changed for said first interval.

4. A serial bus system as set forth in claim 1 wherein the processor for said central station transmits a particular frame on said first conductor at the end of each message and wherein the processors for said substations are programmed to determine whether their subsidiary stations are requesting service from the central station and for changing the logic level of said second conductor after the receipt of said particular frame if such request is present.

5. A serial bus system as set forth in claim 4 wherein the processor for said central station is programmed to poll said subsidiary stations to see which is requesting service from the central station when said second conductor changes state after the central station has transmitted said particular frame.

* * * * *